United States Patent

Persson

[15] 3,689,168
[45] Sept. 5, 1972

[54] MOUNTABLE CHIP BREAKER AND FLUTE CLEANER FOR ROTATING TWIST DRILLS

[72] Inventor: Henry Persson, 224 Glenwood Ave., Bloomfield, N.J. 07003

[22] Filed: Dec. 30, 1971

[21] Appl. No.: 213,961

[52] U.S. Cl. ............... 408/61, 408/241 G, 408/1
[51] Int. Cl. .............. B23b 47/34, B23b 51/08
[58] Field of Search ................ 408/56, 61, 241, 1

[56] References Cited

UNITED STATES PATENTS 2,491,635  12/1949  Allen ..................... 408/056

*Primary Examiner*—Francis S. Husar
*Attorney*—Ralph R. Roberts

[57] ABSTRACT

A chip breaker and flute cleaner for twist drills is adapted for attachment to the worktable or column of a drill press or radial drill or the like. A base member carries an adjustable arm which carries a pair of block supports which is movable to a determined position in guides provided on the end of the arm. Each block support carries a rotatable disc of hardened steel which is disposed at an angle of about 45° to the axis of the drill. The arm and discs are positioned so that the discs are brought adjacent the drill with only a few thousandths of an inch clearance with the edge of the flutes of the drill and preferably at a point where the upwardly moving stringy chips tend to leave the flutes of the rotating drill. As the stringy chip is brought between the rotatable disc and cutting edge of the drill flute the chip is cut to "break" the chip into short lengths. A spray coolant applicator may be used in combination with the chip breaker and flute cleaner so that long stringy chips flow easily up the flutes to be broken between the discs and cutting edges of the flutes. The discs also act as a cleaner for the flute edges as they pass upwardly by the rotatable discs.

11 Claims, 3 Drawing Figures

PATENTED SEP 5 1972
3,689,168
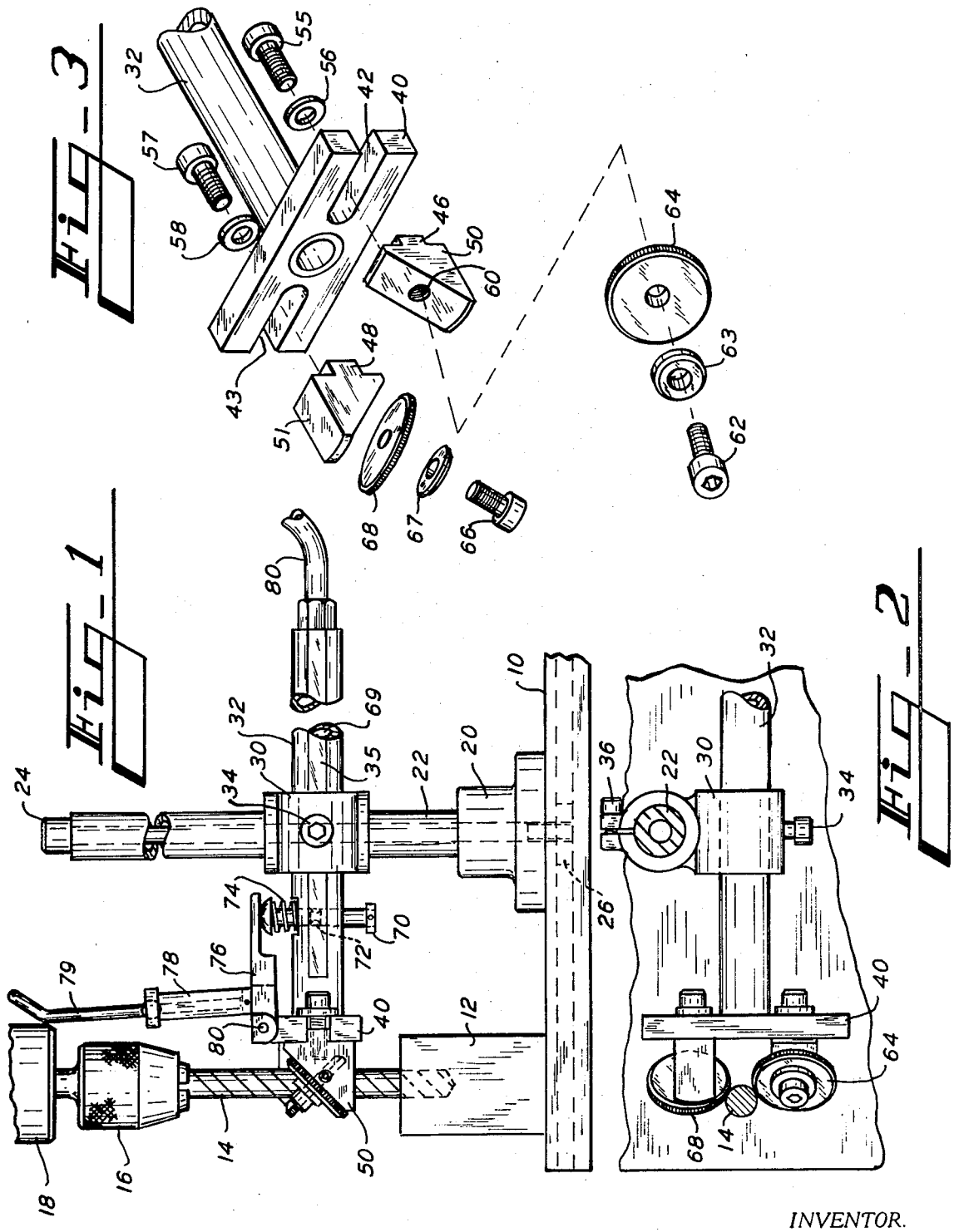
INVENTOR.
HENRY PERSSON
BY
Ralph K Roberts
AGENT

MOUNTABLE CHIP BREAKER AND FLUTE CLEANER FOR ROTATING TWIST DRILLS

BACKGROUND OF THE INVENTION

1. Field of the Invention

With reference to the classification of art as established in the United States Patent Office the art to which the present invention pertains is found generally in the class entitled, "Cutting by Use of Rotating, Axially Moving Tool" and in the subclass of "convertible cutting means" and the further subclass of "utilizing common cutting tool." Also of note is the general class entitled "Brushing, Scrubbing and General Cleaning" and particularly the subclass thereunder identified as "-scrapers." Pertinent art may also be found in the subclass entitled, "implements."

2. Description of the Prior Art

In drilling many metals the chips developing therefrom are often stringy and fail to break after progressing up the flute. Usually these stringy chips will be thrown outwardly and unless disposed of the drilling machine must be stopped to remove the piled up accumulation of chips from the drill. This is time consuming and as the chips are usually razor sharp, at least in places, often result in cut hands. Chip breakers have been known for many years but in general they are combined with drill bushings such as in U.S. Pat. No. 2,669,889 as issued to HULLER on Feb. 23, 1954. The cost and inconvenience of such chip breakers are to be noted but the main objection is that such breakers are useful for only one size of drill and some are useable only with drills of certain cross sections.

In the drilling of holes in metal, plastic and the like where the material being drilled is lightly gummy or sticky in that the material of the workpiece being drilled does not readily slide up the flute of a twist drill it often occurs that the drill as it is fed into the workpiece material to drill the hole has a chip or a portion thereof which adheres to the flute of the drill. If this adhered accumulation in the flute or the cutting edges of the drill is not removed, the drill has a tendency to clog or jam in the hole being drilled or the hole may become oversize. It is therefore highly desirable that the flutes of the drill be kept clean and free of adhered chips so that the chips may readily pass up the flutes of the drill and so that the drill may cut a clean and true-to-size hole. Toward this purpose it is often found that lubricants and coatings are applied to the drill surface and particularly to and in the flutes of the drill. Such applications often assist in maintaining the drill in a clean condition, however, in certain cases after the drill becomes heated, the application becomes less effective and chips tend to adhere and remain partly in the flute. When this occurs it becomes necessary for the operator to stop the drill press and clean the drill. The flutes of the drill may be cleaned by means of a stick of wood, a sharp edged file, a scraper or the like. This is necessary so that the cutting edges of the drill are clean and that no protruding material extends from the cutting edges of the drill to prevent "wander" and oversize holes.

The chip-breaking device as shown in U.S. Pat. No. 2,669,889 to HULLER on February 23, 1954 shows one method of removing chips from the flute of the drill. This device may not effectively remove accumulated material from the cutting edge of the flute, thus requiring additional cleaning. In addition this and like devices are only useful for a particular sized drilled. This requires a large investment where several drill sizes are involved.

As many or all of these known methods of breaking the chips or for cleaning the drill require many minutes of productive time on the part of the operator, it is an intent of the present invention to provide a continuous means for continuously breaking the chips and for rapidly cleaning the flutes of the drill without the necessity of removing the drill from the chuck of the drill press or shutting down the drill press. The method of breaking the chips produced by drilling according to the present invention only requires that a pair of discs carried by the apparatus be adjusted to nearly engage the flute-cutting edges of the twist drill as it is rotated by the drill press. In the present invention the edges of the drill flute are brought next to and by a pair of rotatable discs. These discs are positioned at or slightly above the point where the "stringy" drill chips are thrown outwardly from the drill. As the chip is engaged by a disc it is cut by the sharp cutting flute edge of the rotating drill. As the drill is cycled the edges of the drill are automatically cleaned as the drill is advanced toward, to and into the workpiece. The flute edges as they pass the disc are also cleaned as the drill is withdrawn to its "at rest" or "up" condition as carried by the spindle of the drilling machine. This chip breaking is accomplished with the drilling operation, but if an additional operation is required the spindle is moved up or down to bring the chips and drill by the rotating discs to break or dislodge the chips after which the drill press or apparatus is used in the usual manner.

SUMMARY OF THE INVENTION

The present invention may be summarized at least in part with reference to its objects.

It is an object of the present invention to provide, and it does provide, a chip breaker apparatus in which a pair of disc-shaped rotary members is freely rotatably mounted upon the end of an adjustable beam. These disc members are disposed at an angle and are spaced and positioned so that their peripheries, the cutting edges of the flute, are nearly engaged as the drill is rotated. As the drill is advanced into the work the chips flowing up and outwardly of the flute engage these discs and the cutting flute edges to cut the chips and displace the accumulated material from the edge of the flute of the drill.

It is a further object of this invention to provide, and it does provide, an automatic chip breaker and twist drill flute cleaner for use in drill presses whereby a pair of spaced, freely rotatable hardened discs is disposed at about ninety degrees to each other and at about 45° to the plane of the worktable. The discs are carried in an adjusted spaced relationship on the end of an arm which is adjustably mounted on a post so as to bring the discs into close proximity to the edges of the flutes of a rotating twist drill to cut stringy chips and to clean the flute edges of said drill as the spindle of the drill press is moved up and down.

In the preferred embodiment, as shown and to be hereinafter more fully described, it is contemplated that the chip breaker and flute cleaner are carried by a base removably mounted to the worktable of the drilling machine. A post extending upwardly from the base carries an arm which is adjustable both as to its height from the base and movable parallel to the worktable. One end of the arm carries a guide track or head on which is mounted a pair of support blocks each disposed to freely rotatably carry, at an angle of about 45° to the vertical, a hardened disc. The arm and discs are adjusted so that the discs nearly engage the cutting flutes of the drill as it moves toward and from the workpiece being drilled. Coolant or a vaporized spray of air may be additionally provided if desired. In its preferred adjusted condition the discs are disposed at a height where the chips tend to be thrown outwardly from the drill which is usually slightly above the lower end of the drill when the spindle is at its "up" condition.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the chip breaker and drill flute cleaner for a twist drill as adopted for use with a drilling machine and showing a preferred means for mounting and using the apparatus on a drill press. This specific embodiment has been chosen for the purposes of illustration and description as shown in the accompanying drawing wherein:

BRIEF DESCRIPTION OF THE DRAWING

FIG. 1 represents a side view of the chip breaker and flute cleaner apparatus wherein the flute-engaging discs are shown nearly in engagement with a twist drill as carried by the spindle of a drill press;

FIG. 2 represents a fragmentary plan view of the apparatus of FIG. 1 and showing in particular the arrangement of the engaging discs as they are disposed adjacent the edges of the flute of a rotating drill, and FIG. 3 represents an exploded, isometric view of the several members making up the disc-carrying end of the arm of the flute cleaner.

In the following description and in the claims various details will be identified by specific names for convenience; these names, however, are intended to be generic in their application. Corresponding reference characters refer to like members throughout the three figures of the drawing.

The drawing accompanying, and forming part of, this specification discloses certain details of construction for the purpose of explanation of the broader aspects of the invention, but it should be understood that structural details may be modified in various respects without departure from the concept and principles of the invention.

DESCRIPTION OF THE PREFERRED EMBODIMENT

Referring now to the drawing in particular and to the chip breaker and cleaner as shown in FIGS. 1 through 3, it is to be noted that upon a worktable 10, of a drill press or a drilling machine, is a workpiece 12 supported by said table. Drill 14 is a conventional twist drill having flutes formed in the usual manner and with the shank of the drill being retained in a chuck 16. This chuck is carried on the lower end of a spindle 18 conventionally known and provided in drill presses and drilling machines well known to the trade. The spindle of the drill press is rotated by a motor means, not shown. The rotational speed of the drill press is conventionally adjusted to accomplish the required drilling of the workpiece 12. Stringy chips from the drilling of the hole flow up the flutes of this drill 14 where they are broken or cut by the apparatus of the present invention. In this apparatus is provided a support or base 20, in which is mounted a hollow post 22 through which a draw bolt 24 extends. Base 20 and hollow post 22 are clamped to table 10 by a retaining nut 26 shown in phantom outline in FIG. 1 and mounted on the threaded lower end of bolt 24. When the bolt 24 and nut 26 are tightened, the post 22 and base 20 are drawn to the worktable 10 in a determined and desired fixed position with the post in a fixed vertical relationship to the worktable 10.

A right angle bracket or clamp collar member 30 is disposed to adjustably carry arm 32 parallel to table 10. Arm 32 may be a solid or may be a hollow member, as desired, with a hollow arm being the preferred embodiment as shown in FIGS. 1 and 2. The preferred hollow arm provides a fluid passageway for delivery of a coolant or a blast of air to the workpiece and drilled hole. This delivery is preferably automatically actuated. Carried in a threaded hole in collar member 30 is a clamp screw 34 disposed to engage a flat 35 formed on the side of the arm 32 so as to keep the arm in a desired oriented position with respect to the base 20. On the opposite side of member 30 a screw 36 is disposed to actuate the split-clamp portion of the bracket 30 to selectively draw the bracket 30 into a desired tightened condition upon the post 22. On the left end of arm 32 is carried and fixedly mounted a head end member 40. Member 40 is formed with a pair of slots 42 and 43 which is adapted for slidably receiving and retaining tongue member portions 46 and 48 of blocks 50 and 51 whose constructional details are particularly disclosed in FIG. 3. The tongue portions 46 and 48 in addition to being sized to provide a slidable fit in the slots 42 and 43 also have tapped holes formed in their rear portions so that blocks 50 and 51 may be selectively clamped in the slots. A clamp screw 55 and washer 56 carried thereon are adapted to enter and be turned in the tapped hole in block 50 to clamp this block in slot 42. A cap screw 57 and washer 58 carried thereon are like screw 55 and washer 56 and are adapted to enter a threaded hole in block 51 to draw said block into the desired mounted and clamped relationship in slot 43.

The forward faces of the blocks 50 and 51 are formed at an angle of about 45° to their mounting faces. Into the face of block 50 and at right angles thereto is formed a threaded hole 60 which is disposed to receive a cap screw 62 whose shank portion passes through washer 63 to retain one of a pair of hardened discs, this one being identified as 64. When the cap screw 62 is mounted and secured in hole 60 and block 50 is clamped in slot 42 the disc 64 is disposed to be rotated in a more or less freely rotatable condition in a plane which is at an angle of 45° to the axis of the arm 32. In a like manner a cap screw 66 passes through washer 67 and left cleaning disc 68 to enter a tapped hole in the face of block 51. Disc 68 is rotatably retained like the disc 64 which is retained on block 50. As reduced to practice both the disc 64 and 68 are made exactly alike and are interchangeable as are also the washers 63 and 67, screws 62 and 66 and blocks 50 and 51. Blocks 50 and 51 with their mounted discs are made interchangeable simply by rotating 180°. In this manner the manufacturing costs are reduced in that each assembly and the separate components used therein are exactly or substantially alike.

In the preferred embodiment shown in FIG. 1 it is to be noted that in the passageway 69 through the arm 32 there is provided a valve stem 70 which has a fluid-passing groove 72 formed therein. The valve stem 70 is urged upwardly to a determined upper limit by means of a spring 74. The head portion of the stem is in engagement with the right or distal end of a lever arm 76 which is connected to a right angle bracket portion 78 which carries a fixed deflector rod 79 extending upwardly from the upper side of the bracket. The lever arm 76 is pivotally mounted by a pin 80 to a portion of the head end member 40 so that when the spindle 18 of the drill press is moved downwardly it engages the deflecting rod 79 to cause the valve stem 70 to be pushed downwardly a sufficient distance to enable the fluid or air carried in passageway 69 to flow around the recessed groove 72 and out a nozzle or orifice in the end of hollow arm 32. The discharge from the nozzle is directed toward and to the drill 14 and/or hole in the workpiece 12.

USE AND OPERATION

To use the mountable chip breaker and flute cleaner apparatus of this invention it is contemplated that the base 20 and the attached post 22 will be disposed upon the worktable 10 so that the lower end of the bolt 24 may be passed through a slot or hole conventionally found in most worktables. With the nut 26 in threaded engagement with the bolt 24, the bolt is tightened to cause the post 22 to be brought into a fixed and upwardly extending condition on the table 10. Usually this post 22 is mounted sufficiently away from the workpiece 12 so that a substantial work area is available to the operator of the drill press. The arm 32 is then adjusted to bring the two hardened discs 64 and 68 close to and adjacent to the drill 14 which is mounted in the chuck 16. The arm 32 is raised or lowered until the discs are at or slightly above the general level at which the stringy chips begin to leave the interior flute surfaces of the drill when the drill press spindle 18 is at the drilling condition. Screws 55 and 57 are loosened to allow the blocks 50 and 51 to be moved in slots 42 and 43 so as to bring the discs 64 and 68 into close proximity with the cutting edges of flutes of the drill 14. These discs 64 and 68 are of hardened steel and when they engage the chip and the cutting edges of the flute the chips are cut to short lengths. If desired, a fluid coolant or air blast may be provided through the conductor 80 extending to the hollow interior portion 69 of the arm 32. This flow is automatically actuated when and as the spindle 18 is brought downwardly to move the rotating drill into the workpiece 12. The outer portion of the downwardly moving spindle 18 engages the arm 79 to move it clockwise around pivot pin 80. The downward movement of the engaged valve stem 72 brings the groove 72 into the passageway 69 thus permitting pressurized coolant or air to be directed toward and to the drill 14 as it drills a hole in the workpiece 12. When and as the drill is withdrawn from the workpiece the discs 64 and 68 engage any material extending beyond the flute-cutting edges of the drill to cause any material accumulated thereon and not previously cut to be dislodged from the drill. In addition to cutting the chips into short discharging lengths the discs in particular insure that the cutting edges of the flutes will be clean so as to maintain their original diameter when entering a drill bushing or hole. When the spindle 18 of the drill press reaches its upward "at rest" condition, the arm 79 is urged in a counterclockwise direction by the spring 74 which engages the head of the valve stem 70 to move it upwardly causing groove 72 to pass from the passageway 69 resulting in the flow of coolant or air through tube 80 being cut off until the drill 14 is again brought downwardly into another workpiece or to reenter workpiece 12 to drill the hole to a deeper extent.

The cutting edges of the drill, in both the downward and upward stroke, pass by the rotatable hardened discs 64 and 68 as the drill is rotated. It has been found that for efficient cutting of the chips the discs 64 and 68 should be spaced apart so that the included angle between the nearly engaging points of the drill flutes and the two discs are from 90 to 120° apart and on the back side of the drill. This spacing allows a visual operation of the drill press and drill by the operator as he moves the drill into the workpiece while at the same time, the discs engage chips as they emerge from the flute edges to cut or "break" the chips into short lengths readily removable from the work area and requiring no "down" time for removing the chips from the flutes of the drill. The discs are spaced to accommodate the diameter of the drill in the chuck. Everytime a drill is changed as to size the discs are repositioned adjacent the drill. Sometimes only the shaft 32 is adjusted to accommodate the drill and bring the discs adjacent the cutting flutes.

The periphery of the discs 64 and 68 is shown as lightly scored or having a straight knurled surface. This is a preferable construction in that it insures the engagement of the chip with the disc to provide a rolling shear cut of the chip between the disc and the flute edge during the drilling of the hole. The angle of the axis of the discs is also a matter of selection; however, it has been found that an effective cutting action is provided when the disc engages the twist flute edge at an angle which may be ten or twenty degrees from a right angle to the flute edge. This is not to preclude discs lying in a plane parallel to the axis of arm 32 or normal to the drill. It is also to be noted that the base 20 and hollow post 22 construction are a convenient and preferred way of providing a vertical support for arm 32. However, the arm may be supported by a clamp means carried by the column of the drilling machine or a V-block or the like fastened to the worktable of the drilling machine. It is only necessary that the freely rotatable discs 64 and 68 be spaced so as to provide a trough pattern which is brought into close proximity to the cutting edges of the flutes during the drill movement as a hole is drilled in the workpiece. These discs, if desired, may be carried on a hydraulically actuated arm which may be cycled in response to drill use so as to bring the discs into chip-breaking condition only during the actual drilling operation.

In the spacing of the discs from the cutting edges of the flute the operator must take into consideration the size of the drill, the composition and thickness of the chip. The discs are positioned above the workpiece at about the point where the chip has nearly left the drill so that a nearly full cut of the chip is made. The cutting action between the disc and flute-cutting edge is a rolling shear cut. The clearance between the discs and the cutting flute may be as little as four- or five-thousandths of an inch for small drills up to one sixty-fourth of an inch in the case of large drills and heavy chips. The upward stroke or movement of the drill as it is brought by the discs provides a cleaning action which is beneficial when dealing with particularly difficult chips. As the depth of the hole or drill speed is changed it may be necessary to raise or lower the arm 32 to accommodate the movement of the chip from the flutes of the drill.

METHOD FOR CLEANING ROTATING TWIST DRILLS

The above-described apparatus lends itself toward providing a novel method for breaking the chips and for cleaning the cutting edges of twist drills. In this method is provided the steps of mounting the twist drill in the chuck of the spindle of the drilling apparatus; arranging a pair of freely rotatable hardened discs so that their peripheries are disposed in close proximity to the cutting flute edges of the drill; arranging the discs at a determined height above the workpiece being drilled so that stringy chips developed from the cutting of the rotating twist drill engage said discs to cut the chip between the discs and the edges of the drill, and moving the drill to and from the workpiece while the rotatable discs are retained in a determined close proximity with the flute edges of the drill.

Terms such as "left," "right," "up," "down," "bottom," "top," "front," "back," "in," "out," "clockwise," "counterclockwise" and the like are applicable to the embodiment shown and described in conjunction with the drawing. These terms are merely for the purposes of description and do not necessarily apply to the position in which the mounted chip breaker and flute cleaner for rotating twist drills may be constructed or used.

While a particular embodiment of the mounted chip breaker and flute cleaner has been shown and described it is to be understood that the invention is not limited thereto and protection is sought to the broadest extent the prior art allows.

What is claimed is:

1. A mountable chip breaker and flute cleaning apparatus for removing stringy chips and accumulated and unwanted material from the flutes and cutting edges of a twist drill carried in a drilling apparatus having a spindle and a worktable, said apparatus and drilling apparatus in combination including: (a) a drilling apparatus including a workpiece support and a rotatable and rotating spindle movable toward and away from said workpiece support, said spindle having means for retaining a twist drill during the rotating and movement of said spindle; (b) a support arm; (c) means for releasably clamping said support arm at a selected distance above the workpiece support member of the drilling apparatus, said clamping means enabling the arm to be positioned at a determined attitude and distance from a twist drill carried by said spindle; (d) a pair of hardened discs carried on the end of said arm, said discs in their mounted condition being freely rotatable in determined planes and with said discs spaced from each other so as to be brought into close proximity with the drill in a trough-like attitude to the cutting edges of a twist drill at two points substantially less than one hundred eighty degrees apart, and (e) means for retaining said support arm and mounted discs at a point at a determined distance above the workpiece being drilled, said distance being substantially at the point where the stringy chips are disposed to leave the flutes of the drill with the chips being caught and severed by a cutting action developed between and by the periphery of the discs and the cutting edge of a flute of the drill.

2. A mountable chip breaker and flute cleaner as in claim 1 in which the discs are carried on a head end member of the support arm, each disc being carried by a block member releaseable and adjustably mounted on said head end member.

3. A mountable chip breaker and flute cleaner as in claim 2 in which the workpiece support is a worktable and in which the support arm is releaseably mounted so as to be substantially parallel to the worktable.

4. A mountable chip breaker and flute cleaner as in claim 3 in which the discs are carried in separate planes at about 90° to each other and with each plane being about 45° to the axis of the support arm.

5. A mountable chip breaker and flute cleaner as in claim 2 in which the workpiece support is a worktable and in which the support arm is carried by a post member releaseably mounted on said table.

6. A mountable chip breaker and flute cleaner as in claim 5 in which the support arm is adapted to carry pressurized air, coolant fluid and the like to a nozzle means to direct a discharge thereof toward and to the twist drill.

7. A mountable chip breaker and flute cleaner as in claim 6 in which the flow of pressurized air, coolant and the like to the drill is caused to be released and shut off in response to the movement of the spindle of the drilling apparatus toward and from the workpiece.

8. A mountable chip breaker and flute cleaner as in claim 7 in which the discs are adjustably mounted on the end of said support arm and each is carried in a separate plane about 90° to each other and with each about 45° to the plane of the axis of the support arm.

9. The method of breaking stringy chips and cleaning the cutting edges of the flutes of twist drill as the rotating drill is moved toward, to and into a workpiece, and during the withdrawal of the rotating drill, said method including the steps of: (a) securing a twist drill by its shank in the chuck of a spindle of a drilling machine; (b) arranging a pair of spaced, freely rotatable hardened discs so that the peripheries of the discs are disposed in close proximity to the transcribed circle of the rotation of the cutting flute edges of the drill to establish near engaging points, said near engaging points being disposed at points less than one hundred-eighty degrees apart on said circle; (c) positioning the near engaging points of the cutting edges of a rotating twist drill with said discs at a determined elevation above the hole being drilled, which elevation is that at which stringy chips are discharged outwardly from the rotating drill, and (d) moving the drill to and from the workpiece while the rotatable discs engage the stringy chips to push them into the cutting flute edges of the rotating drill and sever the chips into short lengths.

10. The method of breaking stringy chips and cleaning the cutting edges of a rotating twist drill as in Claim 9 in which the arranged discs are disposed in planes at about ninety degrees to each other and in which the step of positioning the engaging points on the drill includes positioning said discs so as to develop the cutting of the chips at a position opposite the operator.

11. The method of breaking stringy chips and cleaning the cutting edges of a rotating twist drill as in Claim 10 in which there is provided the step of directing a controlled flow of coolant, pressurized air and the like toward and to the drill as it is moved toward, to and into the workpiece.

* * * * *